(12) United States Patent
Kono et al.

(10) Patent No.: US 10,836,945 B2
(45) Date of Patent: Nov. 17, 2020

(54) CHEMICAL HEAT STORAGE MATERIAL, AND COMPOSITION FOR FORMING CHEMICAL HEAT STORAGE MATERIAL

(71) Applicant: NIPPON PAINT HOLDINGS CO., LTD., Osaka (JP)

(72) Inventors: Tomohiro Kono, Tokyo (JP); Toshitaka Koyama, Tokyo (JP)

(73) Assignee: Nippon Paint Holdings Co., Ltd., Osaka (JP)

( * ) Notice: Subject to any disclaimer, the term of this patent is extended or adjusted under 35 U.S.C. 154(b) by 33 days.

(21) Appl. No.: 15/560,450

(22) PCT Filed: Mar. 29, 2016

(86) PCT No.: PCT/JP2016/060170
§ 371 (c)(1),
(2) Date: Sep. 21, 2017

(87) PCT Pub. No.: WO2016/158973
PCT Pub. Date: Oct. 6, 2016

(65) Prior Publication Data
US 2018/0072934 A1    Mar. 15, 2018

(30) Foreign Application Priority Data

Mar. 31, 2015   (JP) ................ 2015-072583

(51) Int. Cl.
*C09K 5/00*  (2006.01)
*C09K 5/16*  (2006.01)

(52) U.S. Cl.
CPC ...................... *C09K 5/16* (2013.01)

(58) Field of Classification Search
None
See application file for complete search history.

(56) References Cited

U.S. PATENT DOCUMENTS

| | | | | |
|---|---|---|---|---|
| 4,187,189 | A * | 2/1980 | Telkes | C09K 5/063 252/70 |
| 2007/0079825 | A1 * | 4/2007 | Sera | C09K 5/063 126/620 |
| 2007/0209365 | A1 * | 9/2007 | Hamer | C09K 5/00 60/648 |
| 2009/0199994 | A1 * | 8/2009 | Amano | C09K 5/063 165/10 |
| 2012/0309885 | A1 * | 12/2012 | Hirano | C09K 5/14 524/404 |
| 2016/0130492 | A1 * | 5/2016 | Matsumura | C09K 5/063 252/75 |
| 2016/0251588 | A1 * | 9/2016 | Hansch | C10L 1/222 44/422 |

FOREIGN PATENT DOCUMENTS

| | | |
|---|---|---|
| CN | 101037519 A | 9/2007 |
| CN | 102211897 A | 10/2011 |
| CN | 102757771 A | 10/2012 |
| CN | 102816438 A | 12/2012 |
| CN | 102992703 A | 3/2013 |
| CN | 103555280 A | 2/2014 |
| JP | 2009-227772 A | 10/2009 |
| JP | 2009-227773 A | 10/2009 |
| JP | 2009-256520 A | 11/2009 |
| JP | 2012-082291 A | 4/2012 |
| JP | 2012-127588 A | 7/2012 |
| JP | 2015-007174 A | 1/2015 |
| WO | WO2009/093607 A1 | 7/2009 |

OTHER PUBLICATIONS

Chinese Office Action issued in the CN Patent Application No. CN201680017435.4, dated Jul. 16, 2019; pp. 1-10.

* cited by examiner

*Primary Examiner* — Necholus Ogden, Jr.
(74) *Attorney, Agent, or Firm* — Muncy, Geissler, Olds & Lowe, P.C.

(57) ABSTRACT

The purpose of the present invention is to provide: a chemical heat storage material which may be molded into an article having high strength and high heat conductivity; and a composition for forming a chemical heat storage material, whereby it becomes possible to mold the chemical heat storage material in a desired shape. A chemical heat storage material comprising a Group-2 element compound, a boron compound and a silicone polymer; and a composition for forming a chemical heat storage material, said composition comprising a Group-2 element compound, a boron-containing compound, at least one component selected from the group consisting of an alkoxysilane, a hydrolysate of the alkoxysilane and a condensation product of the alkoxysilane, and a resin.

4 Claims, No Drawings

CHEMICAL HEAT STORAGE MATERIAL, AND COMPOSITION FOR FORMING CHEMICAL HEAT STORAGE MATERIAL

TECHNICAL FIELD

The present invention is directed to a chemical heat storage material and a composition for forming a chemical heat storage material.

BACKGROUND ART

Recently, in order to reduce consumption amount of fossil fuels and achieve energy saving, a heat storage technique to store and use exhaust heat from factories or power plants has been developed. As a typical heat storage technique like this, for instance, a technique to store heat in connection with phase transition of a substance, typically changing from water to ice, is known (latent heat storage).

In the latent heat storage, a time period during which heat can be stored generally tends to be short. Further, in the latent heat storage, amount of heat which can be stored per unit volume (heat storage density) tends to be low. Therefore, with the latent heat storage, it is difficult to store heat for a long time period or to transport heat. In consideration of such circumstances, among heat storage techniques, attention has been focused on, inter alia, chemical heat storage materials, which can facilitate transportation of heat, because heat storage for a long time period is possible and the heat density is high.

The chemical heat storage is more concretely described. For instance, in chemical heat storage using a calcium oxide/water system, calcium oxide in a chemical heat storage material can release heat generated when calcium oxide in the chemical heat storage material is hydrated. Reversely, heat can be stored in the chemical heat storage material by heating and dehydrating calcium hydroxide produced by hydration of calcium oxide. As above, using a chemical heat storage material enables heat to be repeatedly released and stored through heat generation and heat absorption in connection with chemical change of a substance.

The chemical heat storage material may be packed into, for instance, a heat exchanger to recover heat. When heat is recovered with a heat exchanger using inorganic powder such as calcium oxide or the like as a chemical heat storage material (hereinafter, referred to as "heat exchange type reactor"), heat recovery efficiency tends to be low, because heat conductivity of the chemical heat storage material in a state of powder is low and therefore it is difficult to recover heat from a site which is remote from a heat exchanging face. Further, chemical heat storage materials in a state of powder are difficult to handle, since voids sometimes generate during filling.

Regarding these problems, it is disclosed to use chemical heat storage materials in a form of pellet, which have higher heat conductivity and easier handle ability than the chemical heat storage materials in a state of powder (refer, for instance, to Patent Document 1). Further, a technique is also known that in order to improve heat exchange efficiency of a heat exchanging type reactor, a layer comprising a chemical heat storage material is formed on a heat exchanging face (refer, for instance, to Patent Document 2).

Patent Document 1: Japanese Unexamined Patent Application, Publication No. 2009-227772

Patent Document 2: Japanese Unexamined Patent Application, Publication No. 2012-127588

DISCLOSURE OF THE INVENTION

Problems to be Solved by the Invention

Incidentally, inorganic powder such as calcium oxide used in the chemical heat storage material increases in volume when hydrated, and vice versa, decreases in volume when dehydrated. An object of the technique disclosed in Patent Document 1 is to improve strength of a chemical heat storage material in pellet form by adding a clay mineral thereto and to prevent pulverization of the chemical heat storage material due to increases and decreases in volume thereof. However, the technique disclosed in Patent Document 1 is not satisfactory as a technique to improve strength of chemical heat storage materials molded into the form of pellet. Further, in the technique disclosed in Patent Document 2, no attention is paid to strength of chemical heat storage material formed on a heat exchanging face.

Furthermore, since it is not easy for water to penetrate into the inside of a chemical heat storage material molded into the form of pellet, the chemical heat storage material does not sometimes have sufficient exothermic performance (ability to raise the temperature of water, which a chemical heat storage material is added to) compared to inorganic powder.

As described above, it is a status quo that no chemical heat storage materials have been found yet which have high strength and high heat conductivity in the state of being molded into the form of pellet. Furthermore, no compositions for forming a chemical heat storage material have been found yet which can mold such a chemical heat storage material into a desired shape.

The present invention has been made in light of the above-mentioned problem and the object of the present invention is to provide a chemical heat storage material having high strength and high heat conductivity in the molded state and to provide a composition for forming a chemical heat storage material which can mold such a chemical heat storage material into a desired shape.

Means for Solving the Problems

The present invention is directed to a chemical heat storage material comprising a Group-2 element compound, a boron compound and a silicone polymer.

Further, it is preferred that the Group-2 element compound is calcium oxide and the contents of calcium atoms, boron atoms and silicon atoms in the chemical heat storage material are 13 to 59% by mass, 0.4 to 11.3% by mass and 4.8 to 33.2% by mass, respectively.

Furthermore, it is preferred that the Group-2 element compound is magnesium oxide and the contents of magnesium atoms, boron atoms and silicon atoms in the chemical heat storage material are 8.3 to 46.5% by mass, 0.5 to 11.9% by mass and 6.2 to 35.1% by mass, respectively.

Furthermore, it is preferred that the Group-2 element compound is strontium oxide and the contents of strontium atoms, boron atoms and silicon atoms in the chemical heat storage material are 24.5 to 75.8% by mass, 0.2 to 9.8% by mass and 2.8 to 28.6% by mass, respectively.

Furthermore, it is preferred that the Group-2 element compound is barium oxide and the contents of barium atoms, boron atoms and silicon atoms in the chemical heat storage material are 33.7 to 83.1% by mass, 0.2 to 8.6% by mass and 2.0 to 25.0% by mass, respectively.

Further, the present invention is directed to a composition for forming a chemical heat storage material, comprising a Group-2 element compound, a boron-containing compound, at least one selected from the group consisting of an alkoxysilane, a hydrolysate thereof and a condensate thereof, and a resin.

As the Group-2 element compound, at least one of calcium hydroxide and magnesium hydroxide is preferably contained.

As the boron-containing compound, at least one selected from the group consisting of boric acid, trialkyl borates and triaryl borates is preferably contained.

As the resin, at least one selected from the group consisting of polyvinyl alcohol, modified polyvinyl alcohol, polyethylene glycol, polyethylene oxide, a hydroxyl group-containing acrylic resin and a butyral resin is preferably contained.

Further, it is preferable to further contain glass fibers.

In addition, it is preferable that the alkoxysilane is at least one of triethoxysilane and tetraethoxysilane.

Furthermore, the present invention is directed to a method for producing a chemical heat storage material, comprising the step of coating a metal substrate surface with a composition for forming a calcined chemical heat storage material, wherein the composition for forming a chemical heat storage material on the metal substrate surface is calcined at 200 to 1200° C. for 30 to 120 minutes; and the step of calcining after the coating step.

Effects of the Invention

According to the present invention, it is possible to provide a chemical heat storage material having high strength and high heat conductivity in the molded state and to provide a composition for forming a chemical heat storage material which can mold such a chemical heat storage material to a desired shape.

PREFERRED MODE FOR CARRYING OUT THE INVENTION

Embodiments of the present invention are explained below. Incidentally, the present invention is not limited to the embodiments described below.
<Chemical Heat Storage Material>

The chemical heat storage material according to the present embodiment comprises a Group-2 element compound, a boron compound and a silicone polymer.

The Group-2 element compounds contained in the chemical heat storage material are not particularly limited, so far as reversible chemical reaction can be performed. The Group-2 element compound is a compound comprising any one of metals selected from beryllium, magnesium, calcium, strontium, barium and radium, which are elements of Group 2. It is preferred that the Group-2 element compound produces heat by hydration and after the hydration, reversely, the compound stores heat by dehydration. As Group-2 element compounds which generate heat by hydration and after the hydration, reversely, store heat by dehydration, the compounds indicated in Table 1 may be exemplified. "Heat storage operation temperature" of Table 1 refers to a temperature at which exothermic reaction of an indicated compound takes place and "heat storage density" refers to a released heat energy amount per unit volume of an indicated compound.

TABLE 1

| Compound of Group-2 elements (reaction formula) | Heat storage operation temperature (° C.) | Heat storage density (GJ/m$^3$) |
| --- | --- | --- |
| $MgO + H_2O \Leftrightarrow Mg(OH)_2$ | 350 | 1.0~1.5 |
| $CaO + H_2O \Leftrightarrow Ca(OH)_2$ | 500 | 1.0~1.5 |
| $Mg_{0.5}Ni_{0.5}O + H_2O \Leftrightarrow Mg_{0.5}Ni_{0.5}(OH)_2$ | 300 | 0.3~0.5 |
| $CaCl_2 + nH_2O \Leftrightarrow CaCl_2 * nH_2O$ | 100~250 | 1.5~3.0 |
| $CaSO_4 + nH_2O \Leftrightarrow CaSO_4 * nH_2O$ | 100 | 1.5~3.0 |

Among the Group-2 element compounds described in Table 1, it is preferred for the chemical heat storage material to contain at least one of calcium oxide and magnesium oxide, on account of high heat storage operation temperature and high heat storage density. Further, it is possible to obtain calcium oxide and magnesium oxide at a low cost. Strontium oxide and barium oxide may be also preferably used as the Group-2 element compound.

The boron compound contained in the chemical heat storage material is boron oxide or the like derived from the boron-containing compound contained in the composition for forming a chemical heat storage material described below. Strength of the chemical heat storage material molded into a pellet form is improved by containing a boron compound. Although the reason why strength of the chemical heat storage material is improved by containing a boron compound is not necessarily clear, it is considered that boron atoms are contained in a silicone polymer described below, and thereby a melting point of the silicone polymer decreases, resulting in stretching property (increase in flexibility).

The silicone polymer contained in the chemical heat storage material is a silicone polymer obtained by condensation of at least one selected from the group consisting of an alkoxysilane, a hydrolysate thereof and a condensate thereof (which may be referred to as an alkoxysilane or the like, hereinafter) which are contained in the composition for forming a chemical heat storage material described below. The silicone polymer obtained by condensation of the alkoxysilane or the like is preferably converted to a structure in which all alkoxy groups bonding to silicon atoms are removed in the calcination step described below. The silicone polymer forms a closely packed three-dimensional structure, which prevents the chemical heat storage material from collapsing. Additionally, the silicone polymer can hold a Group-2 element compound inside the closely packed three-dimensional structure.

As the silicone polymer, a silicone polymer obtained by condensation of at least one selected from the group consisting of at least one of triethoxysilane and tetraethoxysilane, a hydrolysate thereof and a condensate thereof is preferred, because a more dense three-dimensional structure can be formed. Further, the content of the silicone polymer in the chemical heat storage material is preferably 12 to 83% by mass. When the content of the silicone polymer in the chemical heat storage material is less than 12%, the chemical heat storage material easily collapses, whereas when the content is greater than 83% by mass, heat amount which the chemical heat storage material can release tends to be small.

When the Group-2 element compound is calcium oxide, it is preferred that the contents of calcium atoms, boron atoms and silicon atoms in the chemical heat storage material are 13 to 59% by mass, 0.4 to 11.3% by mass and 4.8 to 33.2% by mass, respectively. Calcium atoms, boron atoms, and silicon atoms contained in the chemical heat storage material are derived from calcium oxide, a boron compound and a silicone polymer, respectively.

When the content of calcium atoms in the chemical heat storage material is less than 13% by mass, the heat amount which the chemical heat storage material can release is small because of an amount of calcium oxide being small. When the content of calcium atoms in the chemical heat storage material is greater than 59% by mass, the chemical heat storage material tends to easily collapse due to decrease in the amount of silicone polymer.

When the content of boron atoms in the chemical heat storage material is less than 0.4%, strength of the chemical heat storage material tends to decrease. When the content of boron atoms in the chemical heat storage material is greater than 11.3% by mass, the chemical heat storage material tends to easily collapse since the amount of silicone polymer decreases.

When the content of silicon atoms in the chemical heat storage material is less than 4.8% by mass, the chemical heat storage material tends to easily collapse since the amount of silicone polymer is low. When the content of silicon atoms in the chemical heat storage material is more than 33.2% by mass, a heat amount which the chemical heat storage material can release tends to decrease since the amount of calcium oxide decreases.

For the same reason when the Group-2 element compound is calcium oxide, when the Group-2 element compound is beryllium oxide, the contents of beryllium atoms, boron atoms and silicon atoms in the chemical heat storage material are preferably 3.2 to 24.4% by mass, 0.7 to 12.6% by mass and 8.7 to 37.1% by mass, respectively.

Further, for the same reason, when the Group-2 element compound is magnesium oxide, the contents of magnesium atoms, boron atoms, and silicon atoms in the chemical heat storage material are preferably 8.3 to 46.5% by mass, 0.5 to 11.9% by mass and 6.2 to 35.1% by mass, respectively.

Further, for the same reason, when the Group-2 element compound is strontium oxide, the contents of strontium atoms, boron atoms and silicon atoms in the chemical heat storage material are preferably 24.5 to 75.8% by mass, 0.2 to 9.8% by mass and 2.8 to 28.6% by mass, respectively.

Further, for the same reason, when the Group-2 element compound is barium oxide, the contents of barium atoms, boron atoms and silicon atoms in the chemical heat storage material are preferably 33.7 to 83.1% by mass, 0.2 to 8.6% by mass and 2.0 to 25.0% by mass, respectively.

As described above, when the Group-2 element compounds are calcium oxide, magnesium oxide, strontium oxide and barium oxide, preferred contents of each of the components expressed in mass equivalent are different from each other. However, when these are converted into contents in mole number, these are identical values. Additionally, as the Group-2 element compound, two or more may be selected from calcium oxide, magnesium oxide, strontium oxide and barium oxide and used in combination.

Incidentally, the contents of these atoms (Ca, B, Si and O) in the chemical heat storage material may be obtained by composition analysis using an X-ray fluorescence spectrometer (XRF) or the like. The chemical heat storage material may contain a component other than the Group-2 element compound, the boron compound and the silicone polymer, if necessary.

The chemical heat storage material becomes a porous material by being formed of a composition for forming a chemical heat storage material described below, as a raw material. Further, the chemical heat storage material may be molded into a desired shape by using the composition for forming a chemical heat storage material described below as a raw material. For instance, the chemical heat storage material may be formed on a heat exchanging face of a heat exchanger or may be molded into a pellet form. Heat released from the chemical heat storage material may be used, for instance, by transferring outside using a heat exchanger.

Subsequently, action of the chemical heat storage material is explained below. The chemical heat storage material can repeat heat generation and heat storage. At first, in the step of heat generation wherein heat generation from the chemical heat storage material is performed, the chemical heat storage material is brought into contact with vapor water. At this time, it is preferred that 1.2 times or less of water (vapor water) in molar amount, with respect to the molar amount of the Group-2 element compound such as calcium oxide contained in the chemical heat storage material, is brought into contact. Water brought into contact with the chemical heat storage material penetrates into pores formed inside the chemical heat storage material and heat is satisfactorily generated even inside the chemical heat storage material. When too much water is brought into contact with the chemical heat storage material, water itself consumes the generated heat so that a total heating value decreases. Heat generated from the chemical heat storage material is recovered by a heating medium of a heat exchanger or the like. A method for bringing water into contact with the chemical heat storage material is not particularly limited and may be any of spraying vapor water to the chemical heat storage material, immersion of the chemical heat storage material into liquid water and addition of water to the chemical heat storage material (dropwise addition or sprinkling, etc.). Above all, it is preferred to bring water into contact with the chemical heat storage material by spraying vapor water, since it is easy to uniformly bring water into contact with the chemical heat storage material.

Meanwhile, in the step of storing heat in the chemical heat storage material, a chemical heat storage material containing a Group-2 element compound, such as calcium hydroxide, etc. which is generated by hydration of calcium oxide or the like, is heated. The chemical heat storage material is heated, and thereby hydroxide of the Group-2 element compound in the chemical heat storage material is dehydrated and returns to the state before the heat generation step (for instance, calcium oxide). Water generated in the heat storing step is recovered, where required.

In the heat generating step, volume of the chemical heat storage material increases. More specifically, the volume of the Group-2 element compound in the chemical heat storage material increases by about 20% due to hydration of the chemical heat storage material. Vice versa, in the heat storage step, the volume of the Group-2 element compound in the chemical heat storage material decreases due to heat storage by dehydration. Repetition of increase and decrease in the volume of the chemical heat storage material leads to collapse of the chemical heat storage material molded into a desired shape, resulting in pulverization of the chemical heat storage material. Since the chemical heat storage material according to the present invention is porous, the chemical heat storage material itself can absorb strain in the shape generating due to increase and decrease in volume. Further, the chemical heat storage material according to the present embodiment can be considered to be flexible by containing the boron compound. Therefore, the chemical heat storage material according to the present embodiment does not easily collapse even when heat generation and heat storage are repeated and thus has high strength.

<Composition for Forming a Chemical Heat Storage Material>

The composition for forming a chemical heat storage material according to the present embodiment comprises a Group-2 element compound, a boron-containing compound, at least one selected from the group consisting of an alkoxysilane, a hydrolysate thereof and a condensate thereof and a resin. The above-described chemical heat storage material is formed by using the composition for forming a chemical heat storage material according to the present embodiment.

The Group-2 element compound contained in the composition for forming a chemical heat storage material is the same as the Group-2 element compound contained in the above-described chemical heat storage material. However, it is preferred to use a hydrated Group-2 element compound as the Group-2 element compound contained in the composition for forming a chemical heat storage material. Upon making the composition for forming a chemical heat storage material contain a hydrated Group-2 element compound, the Group-2 element compound is dehydrated in a calcination step in the formation of the chemical heat storage material described below and the volume decreases. Therefore, the chemical heat storage material formed by using the composition for forming a chemical heat storage material comprising the hydrated Group-2 element compound does not easily produce strain even when the volume expands. Therefore, collapse tends not to easily take place. As Group-2 element compounds contained in the composition for forming a chemical heat storage material, calcium hydroxide, magnesium hydroxide, strontium hydroxide and barium hydroxide may be exemplified.

In particular, the composition for forming a chemical heat storage material preferably comprises at least one of calcium hydroxide and magnesium hydroxide as the Group-2 element compound. As indicated in Table 1, calcium hydroxide and magnesium hydroxide have high heat storage operation temperature and high heat storage density.

Further, the composition for forming a chemical heat storage material preferably comprises at least one selected from the group consisting of boric acid, trialkyl borates and triaryl borates, as the boron-containing compound. By the composition for forming a chemical heat storage material comprising these boron-containing compounds, flexibility of the silicone polymer in the chemical heat storage material is improved. It is more preferred that the composition for forming a chemical heat storage material comprises a trialkyl borate, as the boron-containing compound. As trialkyl borates, trimethyl borate or triethyl borate may be exemplified. Trialkyl borates have high reactivity with an alkoxysilane described below and improve flexibility of the silicone polymer in the chemical heat storage material. It is considered that improving flexibility of the silicone polymer in the chemical heat storage material improves strength of the chemical heat storage material in the molded state.

At least one selected from the group consisting of the alkoxysilane, a hydrolysate thereof and a condensate there of contained in the composition for forming a chemical heat storage material forms a silicone polymer in the chemical heat storage material to form a closely packed three-dimensional structure. As alkoxysilanes or the like, for instance, tetraalkoxysilanes, alkyl trialkoxysilanes, dialkyl alkoxysilanes, and partial condensates of these may be exemplified. More specifically, as partial condensates of tetraalkylsilanes, MKC silicate MS51 (a condensate manufactured by Mitsubishi Chemical Corporation) and ethylsilicate 40 (a condensate of tetraethoxysilane manufactured by ColCoat Corporation) may be exemplified.

The alkoxysilane or the like contained in the composition for forming a chemical heat storage material is preferably at least one selected from the group consisting of at least one of triethoxysilane and tetraethoxysilane, a hydrolysate thereof and a condensate thereof, since silicone polymers can form a closely packed three-dimensional structure.

The resin contained in the composition for forming a chemical heat storage material functions as a thickener and further the resin is necessary to maintain the shape of the applied chemical heat storage material. The resin contained in the composition for forming a chemical heat storage material is not particularly limited, so long as the resin may function as described above. The resin may be either a natural resin or a synthetic resin and one selected from polysaccharides such as cellulose, proteins, polyphenols, polyester resins, polyether resins, acrylic resins, polyurethane resins, fluoro resins, epoxy resins or the like, or a combination of two or more of the above may be used. As the resin, the composition for forming a chemical heat storage material preferably comprises at least one selected from the group consisting of polyvinyl alcohol, modified polyvinyl alcohol, polyethylene glycol, polyethylene oxide, a hydroxyl group-containing acrylic resin and a butyral resin. Due to being a hydroxy group-containing resin, these resins have high affinity with the Group-2 element compound and the alkoxysilane or the like. Further, from the viewpoint of stabilizing the shape of the chemical heat storage material, it is preferred that the composition for forming a chemical heat storage material comprises a hydroxy group-containing acrylic resin or a butyral resin. The resin contained in the composition for forming a chemical heat storage material preferably has a volume average molecular weight of 100 to 5,000,000. The volume average molecular weight of the resin contained in the composition for forming a chemical heat storage material can be measured by gel permeation chromatography (GPC) using polystyrene standard sample reference.

As butyral resins, more specifically, S-LEC B series and K series (both manufactured by Sekisui Chemical Co., Ltd.) may be exemplified. Further, as the hydroxyl group-containing acrylic resin, more specifically, polymers which may be obtained by polymerizing a monomer mixture solution comprising secondary hydroxy group monomers such as 2-hydroxybutyl (meth)acrylate, etc., tertiary hydroxy group monomers such as 2-hydroxy-2-methylpropyl (meth) acrylate, etc. and other monomers, according to a conventional method may be exemplified. Incidentally, the resin contained in the composition for forming a chemical heat storage material is removed in the calcination step of the method for forming the chemical heat storage material described below.

Further, the composition for forming a chemical heat storage material preferably comprises glass fiber. The composition for forming a chemical heat storage material comprises glass fiber, and thereby strength of the chemical heat storage material in the molded state is improved.

Furthermore, the composition for forming a chemical heat storage material may comprise at least one of a substance consisting of carbon and a hydrocarbon. The composition for forming a chemical heat storage material comprises at least one of a substance consisting of carbon and a hydrocarbon, thereby more numerous pores are formed inside or on the chemical heat storage material, and thereby it is possible to stabilize the shape of the chemical heat storage material. As the substance consisting of carbon, carbon black, graphite, carbon nanofiber or the like may be exemplified. As the hydrocarbon, paraffin, olefins, cycloalkanes and the like may be exemplified.

More preferably, the composition for forming a chemical heat storage material preferably comprises carbon black and a hydrocarbon, since finer pores are formed inside or on the surface of the chemical heat storage material so that the shape of the chemical heat storage material can be more satisfactorily stabilized. Incidentally, the substance consisting of carbon or the hydrocarbon contained in the composition for forming a chemical heat storage material is removed in the calcination step of the method for forming the chemical heat storage material described later.

The composition for forming a chemical heat storage material preferably comprises a solvent in order to disperse the afore-mentioned components. As the solvent, at least one of organic solvents and water may be used. As the organic solvent, hydrocarbons such as toluene, xylene or the like, ketones such as acetone, methyl ethyl ketone or the like, esters such as ethyl acetate, cellosolve acetate, butyl cellosolve or the like and alcohols may be exemplified.

The composition for forming a chemical heat storage material may comprise a component other than the aforementioned components, if necessary.

<Method for Forming a Chemical Heat Storage Material>

One example of the method for forming the chemical heat storage material according to the present invention is described. The method for forming the chemical heat storage material according to the present invention comprises a coating step and a calcination step. In the coating step, metal substrate surface is coated with the composition for forming a chemical heat storage material in which each of the components described above is mixed with each other by any method. The method for mixing each of the components is not particularly limited. The metal material which is coated with the composition for forming a chemical heat storage material is not particularly limited. As the metal material, metal materials used for heat exchanging faces of heat exchangers are preferred and aluminum, copper, steal materials and stainless steel, or the like may be exemplified. The amount of the composition for forming a chemical heat storage material to be applied in the coating step is preferably from 5 to 50,000 g/m$^2$. When the amount of the composition for forming a chemical heat storage material is less than 5 g/m$^2$, a heating value which may be released from the formed chemical heat storage material tends to be small, and when the amount of the chemical heat storage material is greater than 50,000 g/m$^2$, the formed chemical heat storage material tends to easily collapse. In the method for forming a chemical heat storage material, the method for applying the composition for forming a chemical heat storage material is not particularly limited and any method may be selected.

In the calcination step, after the coating step, the composition for forming a chemical heat storage material on the metal substrate surface is calcined. The calcination step may be performed by using an electric furnace, etc., and an apparatus used for the calcination is not particularly limited. The composition for forming a chemical heat storage material is calcined in the calcination step and thereby the resin and the substance consisting of carbon or hydrocarbon are gasified and removed from the chemical heat storage material. The chemical heat storage material has fine pores formed by the removal of the resin and the substance consisting of carbon or hydrocarbon.

In the calcination step, the composition for forming a chemical heat storage material on the metal substrate surface is calcined preferably at a temperature from 200 to 1,200° C., more preferably at a temperature from 300 to 1,000° C. In the calcination step, when the composition for forming a chemical heat storage material on the metal substrate surface is calcined at a temperature less than 200° C., the chemical heat storage material tends to easily collapse due to shortage of calcination and when it is calcined at a temperature higher than 1200° C., the Group-2 element compound cannot maintain the state of oxide and therefore the heat storage performance of the chemical heat storage material tends to decrease.

In the calcination step, it is preferred that the composition for forming a chemical heat storage material on the metal substrate surface is calcined for 30 to 120 minutes. The resin, substance consisting of carbon and hydrocarbon may remain in the chemical heat storage material after the calcination step, within the scope that function of the chemical heat storage material is not inhibited. When the calcination time in the calcination step is less than 30 minutes, the chemical heat storage material tends to easily collapse due to shortage of calcination. When the calcination time is longer than 120 minutes, air bubbles generate inside the chemical heat storage material, and thereby the chemical heat storage material also tends to easily collapse.

The method for forming the chemical heat storage material of the present application is not limited to the methods described above. The chemical heat storage material of the present invention may be shaped into, for instance, a pellet-like form.

EXAMPLES

Next, the present invention is further explained in detail with reference to the Examples, but is not limited thereto.

Example 1

A polyethylene glycol resin (manufactured by Meisei Chemical Works, Ltd., trade name: "Alkox"); a butyral resin (manufactured by Kuraray Co., Ltd., trade name: "Mowital B20H"); a low condensate of ethyl silicate (manufactured by Colcoat Co., Ltd., trade name: "Ethyl silicate 28"); an organic solvent (manufactured by Nippon Nyukazai Co., Ltd., trade name: "MPG-130", polyethylene glycol methyl ether); and trimethyl borate (manufactured by Tokyo Chemical Industry Co., Ltd., trade name: "Trimethyl Borate") were mixed in the amounts indicated in Table 2 (unit: part(s) by mass). To this mixture, calcium hydroxide in the amount indicated Table 2 was further added and the resulting mixture was sufficiently mixed to obtain a composition for forming a chemical heat storage material. This composition for forming a chemical heat storage material was molded into the form of pellet (cylindrical shape with a diameter of about 5 mm and a height of about 10 mm). This molded composition for forming a chemical heat storage material was placed in an electric furnace and calcined at 1,000° C. for one hour to obtain a chemical heat storage material in the form of pellet. Incidentally, calcium hydroxide is dehydrated by calcination and converted to calcium oxide.

Examples 2 to 13 and Comparative Examples 1 to 4

The same processes as those of Example 1 were repeated to obtain the compositions each for forming a chemical heat storage material and the chemical heat storage materials, except that the amounts of the components of the compositions for forming a chemical heat storage material were changed to those indicated in Tables 2 to 4. Incidentally, in Example 5, glass fiber (manufactured by Central Glass fiber CO., Ltd., trade name: "Middle Fiber") was further added to the mixture of a butyral resin, a low condensate of ethyl silicate, an organic solvent and trimethyl borate. In Example 6, boric acid was used instead of trimethyl borate. In Examples 7 to 13, any one of magnesium hydroxide, strontium hydroxide and barium hydroxide was used instead of calcium hydroxide.

[Atomic Contents of Chemical Heat Storage Material]

A content of each of calcium atoms, silicon atoms and oxygen atoms relative to the total of calcium atoms, silicon atoms and oxygen atoms contained in the chemical heat storage materials is indicated in Tables 2 to 4 as "atomic content in chemical heat storage material".

"Atomic content in chemical heat storage material" was obtained by performing elemental analysis of the chemical heat storage materials using an X-ray fluorescence spectrometer (XRF).

[Evaluation of Shape]

A shape of a chemical heat storage material immediately after the material was formed by calcination in an electric furnace ("after calcination" of Tables 2 to 4) and a shape of the chemical heat storage material after having released heat by immersion in water ("after heat generation" of Tables 2 to 4) were evaluated by viewing. When a pellet maintained shape and no cracks occurred, evaluation was "A"; when fine cracks occurred but the pellet maintained its shape, evaluation was "B"; and when remarkable cracks occurred or the chemical heat storage material turned into powder, evaluation was "C". The results are indicated in Tables 2 to 4. Incidentally, the shapes of the chemical heat storage materials of Comparative Examples 2 to 4 collapsed after heat generation, so that the chemical heat storage materials could not maintain their shapes. Therefore, in Table 4, the shapes of the chemical heat storage materials of Comparative Examples 2 to 4 are described as "unable to evaluate".

[Evaluation of Strength]

Strength of the chemical heat storage materials immediately after being formed by calcination in an electric furnace ("after calcination" of Table 2 to Table 4) and the chemical heat storage material after heat generation by immersion in water ("after heat generation" of Table 2 to Table 4) was evaluated by using a tensile and compression test machine (Technograph manufactured by Minebea Inc.) Concretely, regarding the chemical heat storage materials in the pellet form after calcination and after heat generation, force (unit: N) at which each of the chemical heat storage materials is crushed with load from the above and from below was measured using a tensile and compression test machine. When both forces at which the chemical heat storage materials after calcination and after heat generation are crushed are 10 N or more, it may be judged to have strength which can bear repeated heat generation and heat storage. Incidentally, the chemical heat storage materials of Comparative Examples 2 to 4 could not stably maintain their shapes and the strength could not be evaluated with the tensile and compression test machine. Therefore, the chemical heat storage material of Comparative Examples 2 to 4 were evaluated to be "unable to evaluate" in Table 4.

TABLE 2

| | | Example 1 | Example 2 | Example 3 | Example 4 | Example 5 | Example 6 |
|---|---|---|---|---|---|---|---|
| Component of composition for chemical heat storage material (part(s) by mass) | $Ca(OH)_2$ | 50 | 50 | 50 | 50 | 50 | 50 |
| | $Mg(OH)_2$ | 0 | 0 | 0 | 0 | 0 | 0 |
| | $Sr(OH)_2$ | 0 | 0 | 0 | 0 | 0 | 0 |
| | $Ba(OH)_2$ | 0 | 0 | 0 | 0 | 0 | 0 |
| | Polyethylene glycol resin | 10 | 10 | 10 | 10 | 10 | 10 |
| | Butyral resin | 2 | 35 | 1 | 23 | 2 | 23 |
| | Low condensate of ethyl silicate | 12 | 232 | 8 | 155 | 12 | 155 |
| | Organic solvent | 34 | 663 | 27 | 542 | 33 | 542 |
| | Trimethyl borate | 2 | 70 | 14 | 280 | 4 | 0 |
| | Boric acid | 0 | 0 | 0 | 0 | 0 | 168 |
| | Glass fiber | 0 | 0 | 0 | 0 | 5 | 0 |
| Atomic content in chemical heat storage material (% by mass) | Ca, Mg, Sr or Ba | 59.0 | 13.5 | 58.3 | 13.0 | 53.1 | 13.0 |
| | B | 0.4 | 3.1 | 2.5 | 11.3 | 0.6 | 11.3 |
| | Si | 7.6 | 33.2 | 4.8 | 21.2 | 11.1 | 21.2 |
| | O | 33.0 | 50.2 | 34.4 | 54.5 | 35.2 | 54.5 |
| Evaluation of shape | After calcination | A | A | A | A | A | A |
| | After heat generation | A | A | A | A | A | A |
| Evaluation of strength (N) | After calcination | 25 | 30 | 20 | 35 | 35 | 35 |
| | After heat generation | 20 | 30 | 15 | 35 | 35 | 35 |

TABLE 3

| | | Example 7 | Example 8 | Example 9 | Example 10 | Example 11 | Example 12 | Example 13 |
|---|---|---|---|---|---|---|---|---|
| Component of composition for chemical heat storage material (part(s) by mass) | $Ca(OH)_2$ | 0 | 0 | 0 | 0 | 0 | 0 | 0 |
| | $Mg(OH)_2$ | 40 | 40 | 40 | 40 | 40 | 0 | 0 |
| | $Sr(OH)_2$ | 0 | 0 | 0 | 0 | 0 | 80 | 0 |
| | $Ba(OH)_2$ | 0 | 0 | 0 | 0 | 0 | 0 | 120 |
| | Polyethylene glycol resin | 10 | 10 | 10 | 10 | 10 | 10 | 10 |
| | Butyral resin | 3 | 2 | 35 | 1 | 23 | 3 | 3 |
| | Low condensate of ethyl silicate | 23 | 12 | 232 | 8 | 155 | 23 | 23 |
| | Organic solvent | 66 | 34 | 663 | 27 | 542 | 66 | 66 |
| | Trimethyl borate | 7 | 2 | 70 | 14 | 280 | 7 | 7 |

TABLE 3-continued

|  |  | Example 7 | Example 8 | Example 9 | Example 10 | Example 11 | Example 12 | Example 13 |
|---|---|---|---|---|---|---|---|---|
|  | Boric acid | 0 | 0 | 0 | 0 | 0 | 0 | 0 |
|  | Glass fiber | 0 | 0 | 0 | 0 | 0 | 0 | 0 |
| Atomic content in chemical heat storage material (% by mass) | Ca, Mg, Sr or Ba | 37.7 | 46.5 | 8.6 | 45.9 | 8.3 | 68.5 | 77.7 |
|  | B | 1.4 | 0.5 | 3.3 | 3.3 | 11.9 | 0.7 | 0.5 |
|  | Si | 15.3 | 10.0 | 35.1 | 6.2 | 22.4 | 7.7 | 5.6 |
|  | O | 45.5 | 43.0 | 53.0 | 44.6 | 57.4 | 23.1 | 16.2 |
| Evaluation of shape | After calcination | A | A | A | A | A | A | A |
|  | After heat generation | A | A | A | A | A | A | A |
| Evaluation of strength (N) | After calcination | 25 | 25 | 30 | 20 | 35 | 25 | 25 |
|  | After heat generation | 25 | 20 | 30 | 15 | 35 | 25 | 25 |

TABLE 4

|  |  | Comparative Example 1 | Comparative Example 2 | Comparative Example 3 | Comparative Example 4 |
|---|---|---|---|---|---|
| Component of composition for chemical heat storage material (part(s) by mass) | Ca(OH)$_2$ | 50 | 0 | 50 | 50 |
|  | Mg(OH)$_2$ | 0 | 0 | 0 | 0 |
|  | Sr(OH)$_2$ | 0 | 0 | 0 | 0 |
|  | Ba(OH)$_2$ | 0 | 0 | 0 | 0 |
|  | Polyethylene glycol resin | 10 | 10 | 10 | 0 |
|  | Butyral resin | 8 | 8 | 8 | 0 |
|  | Low condensate of ethyl silicate | 53 | 53 | 0 | 53 |
|  | Organic solvent | 139 | 139 | 139 | 139 |
|  | Trimethyl borate | 0 | 0 | 0 | 0 |
|  | Boric acid | 0 | 0 | 0 | 0 |
|  | Glass fiber | 0 | 0 | 0 | 0 |
| Atomic content in chemical heat storage material (% by mass) | Ca, Mg, Sr or Ba | 25 | 0 | 71 | 25 |
|  | B | 0 | 0 | 0 | 0 |
|  | Si | 31 | 47 | 0 | 31 |
|  | O | 44 | 53 | 29 | 44 |
| Evaluation of shape | After calcination | A | C | C | C |
|  | After heat generation | A | Unable to evaluate | Unable to evaluate | Unable to evaluate |
| Evaluation of strength (N) | After calcination | 20 | Unable to evaluate | Unable to evaluate | Unable to evaluate |
|  | After heat generation | 5 | Unable to evaluate | Unable to evaluate | Unable to evaluate |

[Evaluation of Heat Generation Performance]

Heating values of the chemical heat storage materials in the form of pellet of Examples 1 to 8 were measured. Heating values were measured according to the following procedures. First of all, a predetermined amount of water was added to a vessel covered with a heat insulating material and a chemical heat storage material (for instance, 5 g) was added to the water. The water in the vessel was stirred on a magnetic stirrer and the temperature rising was monitored using a sheath type thermocouple. The temperature measured with the sheath type thermocouple of the water to which each the chemical heat storage materials of the Examples was added greatly rose. The heating value Q (unit: J) of a chemical heat storage material may be obtained according to the following equation (1). ΔT (unit: K) in equation (1) is a value obtained by subtracting a temperature of water immediately before a chemical heat storage material is added from the maximum temperature of water after the chemical heat storage material is added. Here, w is a mass of water in a cup (unit: g) and Cp is a specific heat capacity of water (unit: J/g·K).

[Math. 1]

$$Q = \Delta T \times W \times Cp \quad (1)$$

Upon comparing Examples 1 to 4 of Table 2 with Comparative Example 1 of Table 4, it was found that the evaluation results of strength of the chemical heat storage materials of Examples 1 to 4 and 6 to 8 were better than that of Comparative Example 1, in both "after heat generation" and "after calcination". From these results, it was confirmed that the chemical heat storage material formed by using the composition for forming a chemical heat storage material containing a Group-2 element compound, a butyral resin, a boron-containing compound and a low condensate of ethyl silicate has higher strength than the chemical heat storage material formed by using the composition for forming a chemical heat storage material containing no boron-containing compound.

Further, from the comparison of Examples 1 to 4 of Table 2 and Examples 7 to 13 of Table 3, it was found that the chemical heat storage materials of Examples 7 to 13 have the same strength as the chemical heat storage materials of Examples 1 to 4, both "after heat generation" and "after calcination". From these results, it was confirmed that compounds formed of Group-2 elements other than calcium also may be used for the chemical heat storage material of the present invention.

Furthermore, from the results of Comparative Examples 2 to 4, it was found that the chemical heat storage materials formed by using the compositions for forming a chemical heat storage material of Comparative Examples 2 to 4 resulted in bad shape evaluation. From these results, it was confirmed that when the composition for forming a chemical heat storage material does not contain any one of a Group-2 element compound and a resin such as an alkoxysilane or the like, it is not possible to maintain a shape of pellet.

Moreover, as described above, the temperature of water, which the chemical heat storage materials of Examples 1 to 13 were added to, largely rose. From these results, it was confirmed that the chemical heat storage materials in the pellet form of Examples 1 to 13 had heat generation ability. Incidentally, the heating volume Q of each of the chemical heat storage materials in the pellet form of Examples 1 to 13 was equivalent to the theoretical heating volume obtained from the amount of calcium oxide contained in each of the chemical heat storage materials.

Incidentally, it is considered that in the chemical heat storage materials formed by using the composition for forming a chemical heat storage material containing a Group-2 element compound, a boron-containing compound, an alkoxysilane or the like and a resin, particles bind to each other as described above, and therefore water (vapor water) more easily immerses into the inside of pellet than in the chemical heat storage material in the form of pellet containing clay minerals (for instance, the chemical heat storage material disclosed in Patent Document 1 above). The chemical heat storage materials of the Examples, in which water (vapor water) easily immerses into the inside, are expected to have high heat generation performance (ability to raise the temperature of water in the "Evaluation of Heat Generation Performance" above.

The invention claimed is:

1. A chemical heat storage material obtained by calcining the composition comprising:
   a Group-2 element compound of at least one selected from the group consisting of calcium hydroxide, and magnesium hydroxide,
   trimethyl borate, and
   a low condensate of ethyl silicate at 200 to 1200° C.,
   wherein the Group-2 element compound is calcium hydroxide and the contents of calcium atoms, boron atoms and silicon atoms in the chemical heat storage material are 13 to 59% by mass, 0.4 to 11.3% by mass and 4.8 to 33.2% by mass, respectively,
   wherein the Group-2 element compound is magnesium hydroxide and the contents of magnesium atoms, boron atoms and silicon atoms in the chemical heat storage material are 8.3 to 46.5% by mass, 0.5 to 11.9% by mass and 6.2 to 35.1% by mass, respectively.

2. A composition for forming the chemical heat storage material according to claim 1, comprising:
   a Group-2 element compound of at least one selected from the group consisting of calcium hydroxide, and magnesium hydroxide,
   trimethyl borate,
   a low condensate of ethyl silicate, and
   at least one selected from the group consisting of polyethylene glycol and butyral resin.

3. The composition for forming a chemical heat storage material according to claim 2, further comprising glass fiber.

4. A method for producing a chemical heat storage material, comprising the steps of
   coating a metal substrate surface with a composition for forming a chemical heat storage material according to claim 2; and
calcining the composition for forming a chemical heat storage material on the metal substrate surface at 200 to 1200° C. for 30 to 120 minutes after the coating step.

* * * * *